United States Patent
Rice et al.

(10) Patent No.: US 12,177,269 B2
(45) Date of Patent: Dec. 24, 2024

(54) EPHEMERAL LINKS FOR COLLABORATIVE USE ACROSS MEETING INSTANCES

(71) Applicant: MICROSOFT TECHNOLOGY LICENSING, LLC, Redmond, WA (US)

(72) Inventors: Stephen Lincoln Rice, Redmond, WA (US); Sean Lamont Grant Livingston, Bothell, WA (US); Zhenguang Chen, Bellevue, WA (US); Shiguang Dong, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/322,013

(22) Filed: May 23, 2023

(65) Prior Publication Data

US 2024/0396949 A1   Nov. 28, 2024

(51) Int. Cl.
*H04L 65/1069* (2022.01)
*H04L 65/1093* (2022.01)
*H04L 65/403* (2022.01)

(52) U.S. Cl.
CPC ...... *H04L 65/1069* (2013.01); *H04L 65/1093* (2013.01); *H04L 65/403* (2013.01)

(58) Field of Classification Search
None
See application file for complete search history.

(56) References Cited

U.S. PATENT DOCUMENTS

| | | | | |
|---|---|---|---|---|
| 7,657,436 B2* | 2/2010 | Elmore | ........... | G06Q 30/02 705/26.1 |
| 7,844,835 B2* | 11/2010 | Ginter | ........... | H04N 21/443 713/192 |
| 8,112,625 B2* | 2/2012 | Ginter | ........... | H04N 21/443 713/150 |
| 8,677,507 B2* | 3/2014 | Ginter | ........... | H04L 9/3247 380/231 |
| RE45,774 E * | 10/2015 | Beach | ........... | H04N 21/4334 |
| 9,626,667 B2* | 4/2017 | Boccon-Gibod | ....... | H04L 63/10 |

(Continued)

OTHER PUBLICATIONS

International Search Report and Written Opinion received for PCT Application No. PCT/US2024/026925, Oct. 1, 2024, 15 pages.

*Primary Examiner* — Ranodhi Serrao
(74) *Attorney, Agent, or Firm* — Newport IP, LLC; Jacob P. Rohwer

(57) ABSTRACT

The techniques described herein provide the ability for an owner of a content object to send an ephemeral link to participants in a meeting instance. An ephemeral link is a link to a content object that provides access to the content object for a time period associated with the meeting instance. In one example, the time period starts when the content object is shared during the meeting instance and ends when the meeting instance is scheduled to end. Thus, access to the content object via the link expires based on a scheduled end time of the meeting instance. However, in further examples described herein, the owner of the content object can dynamically adjust, via user input, the period of time during which the link provides access to the content object. The dynamic adjustment can extend the access or shorten the access to the content object via the link.

11 Claims, 13 Drawing Sheets

(56) References Cited

U.S. PATENT DOCUMENTS

| | | | |
|---|---|---|---|
| 2007/0185814 A1* | 8/2007 | Boccon-Gibod | H04L 9/3242 705/51 |
| 2010/0067705 A1* | 3/2010 | Boccon-Gibod | H04L 9/0825 380/285 |
| 2011/0208822 A1* | 8/2011 | Rathod | G06Q 30/02 709/206 |
| 2013/0145284 A1 | 6/2013 | Anantharaman et al. | |
| 2015/0100503 A1* | 4/2015 | Lobo | G06Q 10/103 705/301 |
| 2015/0149544 A1* | 5/2015 | Zhang | G06Q 10/109 709/204 |
| 2015/0163206 A1 | 6/2015 | McCarthy | |
| 2015/0310188 A1 | 10/2015 | Ford et al. | |
| 2016/0277410 A1 | 9/2016 | Kalb | |
| 2017/0357917 A1* | 12/2017 | Holmes | G06Q 10/1095 |
| 2019/0052701 A1* | 2/2019 | Rathod | H04L 67/10 |
| 2020/0372140 A1* | 11/2020 | Jaber | H04N 7/15 |
| 2022/0179665 A1* | 6/2022 | Rathod | G06F 9/451 |
| 2022/0247705 A1* | 8/2022 | Liu | H04L 51/212 |
| 2022/0247797 A1* | 8/2022 | Leduc | H04L 12/1822 |

\* cited by examiner

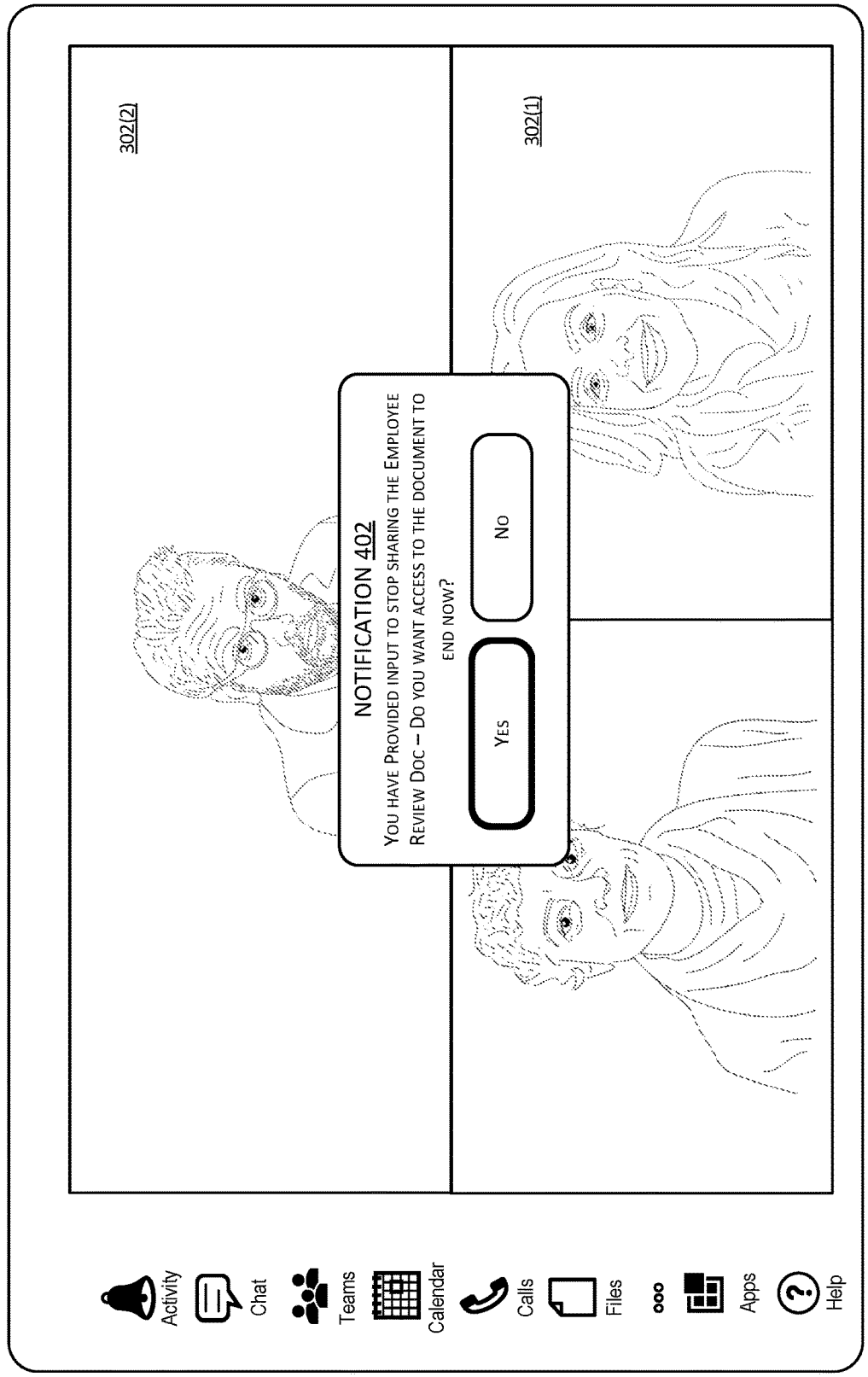

EPHEMERAL LINKS FOR COLLABORATIVE USE ACROSS MEETING INSTANCES

BACKGROUND

Virtual meetings (e.g., videoconferences) have become a staple in productivity contexts (e.g., a work day). As more entities (e.g., companies, agencies, organizations, educational institutions) are moving to work-from-home and/or remote participation situations via the use of cloud services, the ability to collaborate in virtual meetings is crucial to productivity. Despite recent advances, there are still several gaps in what users can do in a virtual meeting versus an in-person meeting. For example, sharing sensitive and/or confidential content through a virtual meeting for collaboration purposes can be a security risk.

To illustrate, an owner of a content object can send out a link to the content object to a group of users invited to the virtual meeting, thereby enabling the group of users to collaborate (e.g., review, modify) on the content object. However, the link typically enables the content object to be accessed by the group of users for an extended period of time (e.g., days, weeks, months, or even longer). Consequently, the link to the content object presents some collaboration control and/or transparency issues for the owner of the content object as individual users in the group can provide modifications to the content object unbeknownst to the owner of the content object. Stated alternatively, the owner of the content object has limited collaboration control and/or limited transparency to modifications because the owner of the content object cannot actively monitor modifications to the content object for the extended period of time (e.g., the owner is not going to keep a document open and in their focus for weeks to see who makes modifications to the document). It is with respect to these and other technical challenges that the disclosure made herein is presented.

SUMMARY

The system described herein provides the ability for an owner of a content object to send an ephemeral link to participants in a meeting instance. An ephemeral link is a link to a content object that provides access to the content object for a time period associated with the meeting instance. In one example, the time period starts when the content object is shared during the meeting instance and ends when the meeting instance is scheduled to end. Thus, access to the content object via the link expires based on a scheduled end time of the meeting instance. However, in further examples described herein, the owner of the content object can dynamically adjust, via user input, the period of time during which the link provides access to the content object. The dynamic adjustment can extend the access to the content object via the link beyond the scheduled end time of the meeting instance or the dynamic adjustment can shorten the access to the content object via the link before the scheduled end time of the meeting instance. Consequently, the access to the content object via the link allows for short-term collaboration with respect to a meeting instance and not for an extended period of time after the meeting instance.

A meeting instance is typically associated with a scheduled duration, and thus, the meeting instance has a scheduled start time and a scheduled end time. The meeting instance is hosted by a virtual (e.g., videoconference) platform, such as TEAMS by MICROSOFT, ZOOM by ZOOM VIDEO COMMUNICATIONS, GOOGLE MEET by GOOGLE, or similar platforms/applications. The meeting instance is a designated occurrence in which a group of users can gather remotely (e.g., via network connections) in order to collaborate on a topic.

As described above, content objects can be shared during a meeting instance. A content object may include documents, videos, spreadsheets, presentations, executable files, audio files, and so forth. A user that initiates the sharing of the content object during the meeting instance is referred to herein as an owner of the content object. The owner of the content object selects the content object to share for collaboration purposes during the meeting instance and provides input designating access to the content object be tied to the meeting instance (as opposed to the conventional extended time period).

Based on the selection and the input, the system identifies the content object and generates an ephemeral link to the content object (referred to herein as "link"). For example, a client (e.g., a user's instance of a meeting application) that belongs to the owner of the content object calls into an application programming interface (API) associated with a service that stores the content object. The call requests the creation of the link. After the call is received via the API, the service that stores the content object creates the link and provides the link back to the client of the owner of the content object. The client of the owner of the content object can then automatically send the link through the virtual meeting platform to other clients of other users that are participating in the meeting instance which thereby enables access to the content object and the group collaboration. Consequently, a layer of security is added in that the link to the content object is not presented to the other users as a direct uniform resource locator (URL), e.g., in a chat. By not presenting the link as a direct URL, the other users are prevented from being able to copy the link and disseminate the link beyond the meeting instance.

When a user that is invited to the meeting instance (i.e., an invitee) joins the meeting instance, the invitee becomes a participant. Upon joining the meeting instance, the system assigns a session identification to the participant. Moreover, the system binds the session identification to the link after the content object is shared by its owner and the link is created. Binding the session identification to the link enables the participant, or the client (e.g., an instance of the meeting application) used by the participant, to access the content object via the link, e.g., for viewing and collaboration during the scheduled meeting instance. The system does not bind the session identification to the link until the content object is shared by its owner during the meeting instance. Therefore, an invitee to the meeting instance who has not joined the meeting instance cannot access the content object via the link because the system has not assigned a session identification and bound the session identification to the link for the invitee.

Consequently, the aforementioned collaboration control and/or transparency issues for the owner of the content object are resolved because the participants can only view and modify the content object after the owner shares the content object and while the owner of the content object is actively monitoring the content object. Stated alternatively, an owner of the content object has complete control of the collaboration context for their content object and does not need to be fearful of the content object being modified via the link for an extended period of time after the meeting instance.

In one example, the system is configured to revoke access to the content object via the link once the meeting instance reaches the scheduled end time. More specifically, once the meeting instance ends, the system unbinds the session identification from the link to the content object. Accordingly, when the link to the content object is created, the system defines an expiration property for the link. The expiration property, by default, is associated with the time when the meeting instance is scheduled to end. However, as further described herein, the expiration property can be dynamically adjusted based on user input. The expiration property triggers the unbinding action for the participants in the meeting instance. Revoking access to the content object via the link prevents further modification to the content object from occurring.

The period of time during which the link provides access to the content object can be dynamically adjusted. For example, an owner of the content object can provide user input to extend the period of time during which the link provides access to the content object beyond the duration of the meeting instance. The dynamic adjustment is enabled by the system prompting the owner to extend the period of time during the meeting instance (e.g., as the meeting instance approaches the scheduled end time). Accordingly, the expiration property is updated based on a default period of time (e.g., five minutes, ten minutes) selected by a user or a user-defined period of time (e.g., eight minutes).

In another example, an owner of the content object can provide user input to shorten the period of time during which the link provides access to the content object such that access is revoked before the meeting instance ends. For instance, the dynamic adjustment is enabled by the system prompting the owner to shorten the period of time to a time when the owner of the content object stops sharing the content object. Alternatively, the user input can be associated with the owner of the content object leaving the meeting instance. That is, if the owner of the content object leaves the meeting instance before the scheduled end time, the system updates the expiration property to the time when the owner of the content object leaves, and thus, the system unbinds the session identifications for the participants when the owner of the content object leaves.

In an alternative example, the system unbinds the session identification from the link to the content object when a participant leaves the meeting instance. For example, if a participant leaves the meeting instance early, the system does not wait for the expiration property to implement the unbinding for that particular participant, but rather automatically revokes the participant's access during the meeting instance in order to ensure the content object is not modified by the particular participant outside the meeting instance. In a more specific example, a meeting application of a participant can issue a request to unbind the session identification from the link after the participant leaves.

In another alternative example, the system enables the owner of the content object to provide revocation input for a group of participants or individual participants, at any time after the link has been shared. The revocation input unbinds the session identification from the link. The owner of the content object may want to provide the revocation input if the owner changes their mind with regard to sharing the content object (e.g., the owner notices some information that should not be shared in a document) and/or the wrong content object is shared.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 4 illustrates an example graphical user interface in which a notification is displayed to the owner of the content object allowing the owner to end access to the content object. The notification allows the owner the opportunity to dynamically adjust the expiration property, e.g., to shorten access to the content object via the link.

DETAILED DESCRIPTION

The techniques described herein provide the ability for an owner of a content object to send an ephemeral link to participants in a meeting instance. An ephemeral link is a link to a content object that provides access to the content object for a time period associated with the meeting instance. In one example, the time period starts when the content object is shared during the meeting instance and ends when the meeting instance is scheduled to end. Thus, access to the content object via the link expires based on a scheduled end time of the meeting instance. However, in further examples described herein, the owner of the content object can dynamically adjust, via user input, the period of time during which the link provides access to the content object. The dynamic adjustment can extend the access to the content object via the link beyond the scheduled end time of the meeting instance or the dynamic adjustment can shorten the access to the content object via the link before the scheduled end time of the meeting instance. Consequently, the access to the content object via the link allows for short-term collaboration with respect to a meeting instance and not for an extended period of time after the meeting instance.

Figure 1:
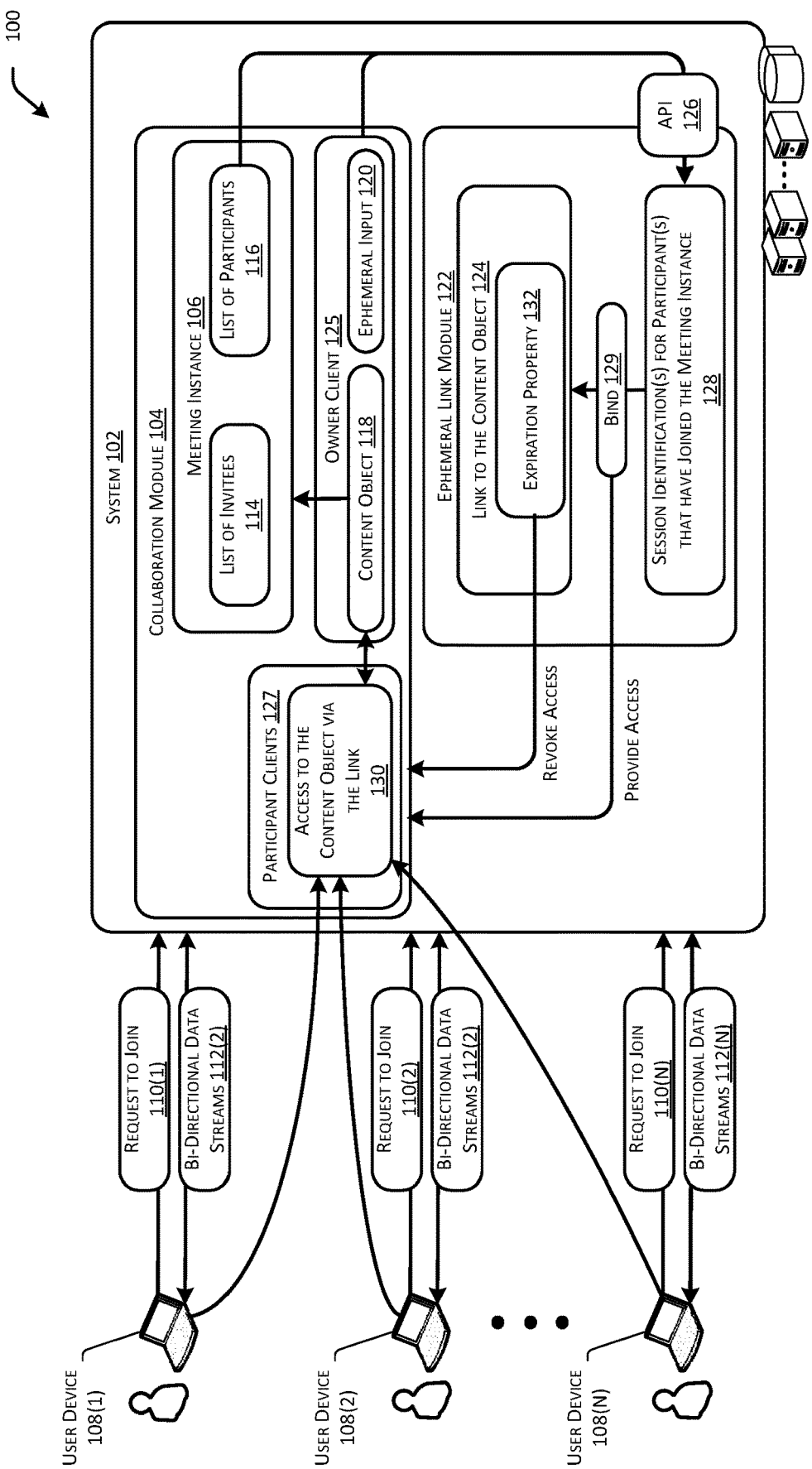
FIG. 1 illustrates an example environment in which a system provides users with access to a content object within a meeting instance via an ephemeral link, allowing for a controlled and transparent collaboration context for the content object.

FIG. 1 illustrates an example environment 100 in which a system 102 provides users with an ephemeral link to a content object within a meeting instance, allowing for a controlled and transparent collaboration context for the content object. As shown, the system 102 includes a collaboration module 104 which hosts a meeting instance 106 for a plurality of users and user devices 108 (1-N) configured with meeting client(s) (e.g., different instances of meeting applications), where N can be any number of users (e.g., two, three, five, ten, one hundred, one thousand). The system 102 and/or the collaboration module 104 are configured to execute a virtual (e.g., videoconference) platform/application, such as TEAMS by MICROSOFT, ZOOM by ZOOM VIDEO COMMUNICATIONS, GOOGLE MEET by GOOGLE, or similar platforms/applications.

To host the meeting instance 106, the collaboration module 104 receives respective requests to join 110 (1-N) from the user devices 108 (1-N). After receiving the respective requests to join 110 (1-N) from the user devices 108 (1-N), the collaboration module 104 enables bi-directional data streams 112 (1-N) (e.g., audio streams, video streams). In this way, a user device 108(1) uploads a data stream associated with its user (e.g., audio, video) and downloads data stream(s) associated with other users of the other devices 108 (2-N).

The meeting instance 106 is typically associated with a scheduled duration, and thus, the meeting instance 106 has a scheduled start time and a scheduled end time. The meeting instance 106 includes a list of invitees 114 and a list of participants 116. As further discussed below, the distinction between a user on the list of invitees 114 and a participant 116 who has actually joins the meeting instance 106 has an effect on the access to a content object 118 that is shared during the meeting instance 106. Accordingly, users of the user devices 108 (1-N) are added to the list of participants 116 after the requests to join 110 (1-N) are received.

The content object 118 can be a document, a video, a spreadsheet, a presentation, an executable file, an audio file, and so forth. A user that shares the content object 118 is the owner of the content object 118. In some instances, the owner of the content object 118 is the organizer (e.g., host) of the meeting instance 106. Accordingly, during the meeting instance 106, the owner selects and shares the content object 118 for collaboration purposes. Moreover, the owner provides input designating that access to the content object be tied to the meeting instance 106, shown in FIG. 1 as ephemeral input 120.

The system 102 further includes an ephemeral link module 122. The ephemeral link module 122 generates the link 124 to the content object 118. When the users and user devices 108 (1-N) join the meeting instance 106, the collaboration module 104 passes the list of participants 116 to the ephemeral link module 122.

In one example, the client (e.g., an instance of the meeting application) that belongs to the owner (the "owner client" 125) of the content object 118 calls into an application programming interface (API) 126 associated with the ephemeral link module 122, which may be part of a service that stores the content object 118. The call requests the creation of the link 124 to the content object 118. After the call is received via the API 126, the ephemeral link module 122 creates the link 124 to the content object 118 and provides the link 124 to the content object 118 back to the owner client 125. The owner client 125 can then automatically send the link 124 to the content object 118 to other clients of the participants 116 to the meeting instance 106 ("participant clients" 127). Consequently, a layer of security is added in that the link 124 to the content object 118 is not presented to the participants 116 as a direct uniform resource locator (URL), e.g., in a chat. By not presenting the link 124 to the content object 118 as a direct URL, the participants 116 (or invitees 114) are prevented from being able to copy the link 124 and disseminate the link 124 beyond the meeting instance 106.

Once the ephemeral link module 122 receives the list of participants 116 from the collaboration module 104, the ephemeral link module 122 assigns session identification(s) 128 to the participants. Moreover, the ephemeral link module 122 binds 129 the session identifications 128 to the link 124. Binding 129 the session identifications 128 to the link 124 enables the participants (e.g., user devices 108 (1-N) via participant clients 127) to access 130 the content object 118 via the link 124, e.g., for viewing and collaboration during the scheduled meeting instance 106. In the environment 100 of FIG. 1, the access 130 to the content object 118 via the link 124 is represented by the arrows between the user devices 108 (1-N) and element 130. Consequently, an invitee on the list 114 who has not actually joined the meeting instance 106 is not provided access to the content object 118 via the link 124.

When the ephemeral link module 122 creates the link 124 to the content object 118, the ephemeral link module 122 defines an expiration property 132 for the link. The expiration property 132 is associated with a time that triggers the revocation of the access 130 to the content object 118 via the link 124.

Figure 2A:
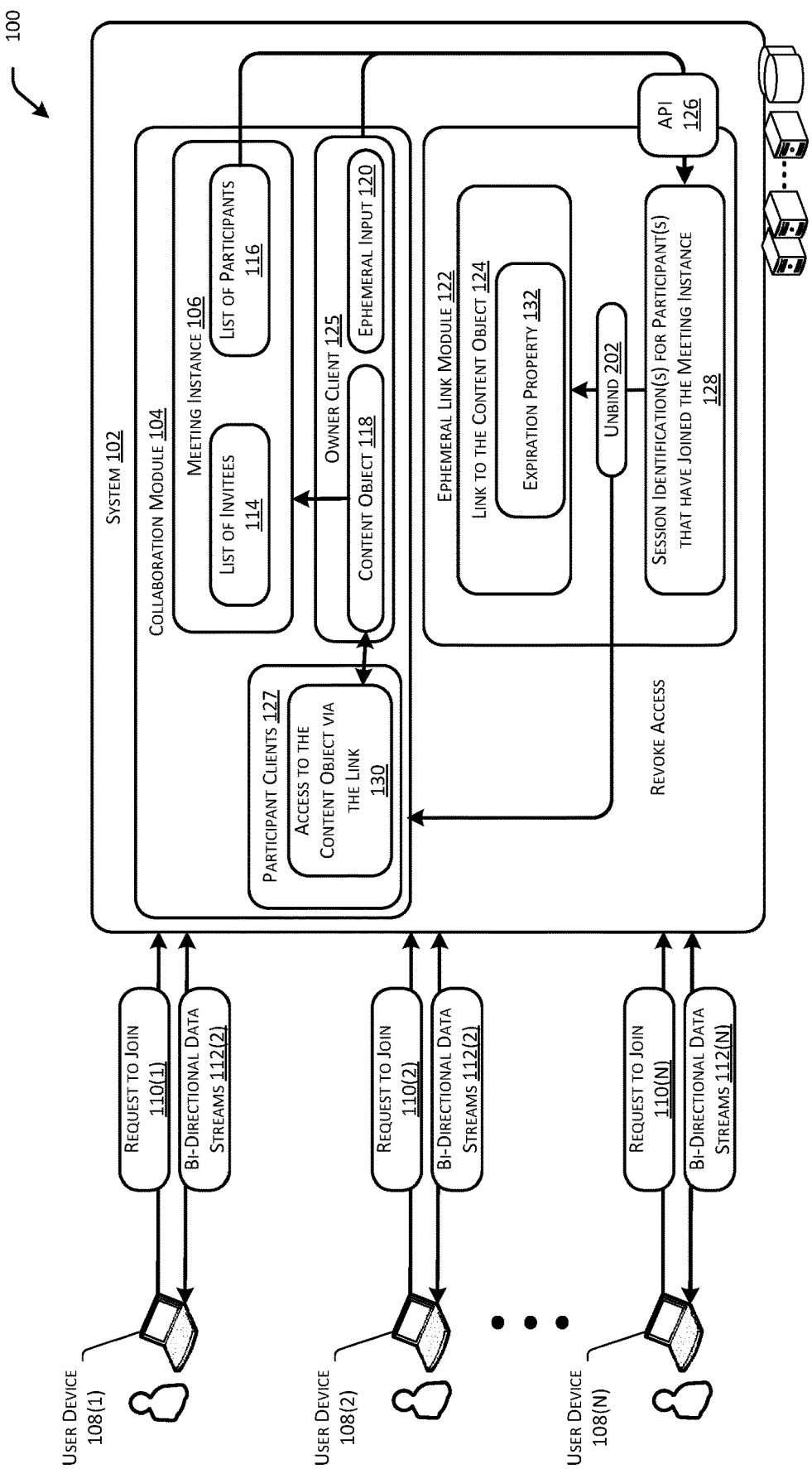
FIG. 2A illustrates the example environment of FIG. 1 in which the system revokes the access to the content object via the ephemeral link based on an expiration property associated with the ephemeral link.

As shown in FIG. 2A, the ephemeral link module 122 revokes the access 130 to the content object 118 via the link 124 by unbinding 202 the session identifications 128 from the link 124 based on expiration property 132. Consequently, the access 130 to the content object 118 via the link 124, as represented by the arrows between the user devices 108 (1-N) and the "access" element 130 in FIG. 1, are removed in FIG. 2A. In one example, the expiration property 132 is initially associated with the scheduled end time of the meeting instance 106 (e.g., by default). However, as further expanded below, the expiration property 132 can be dynamically adjusted based on user input from the owner of the content object.

Consequently, the aforementioned collaboration control and/or transparency issues for the owner of the content object are resolved because the participants can only view and modify the content object while the owner of the content object is actively monitoring the content object (e.g., during the scheduled duration of the meeting instance). Stated alternatively, an owner of the content object has complete control of the collaboration context for their content object and does not need to be fearful of the content object being modified for an extended period of time after the meeting instance.

Figure 2B:
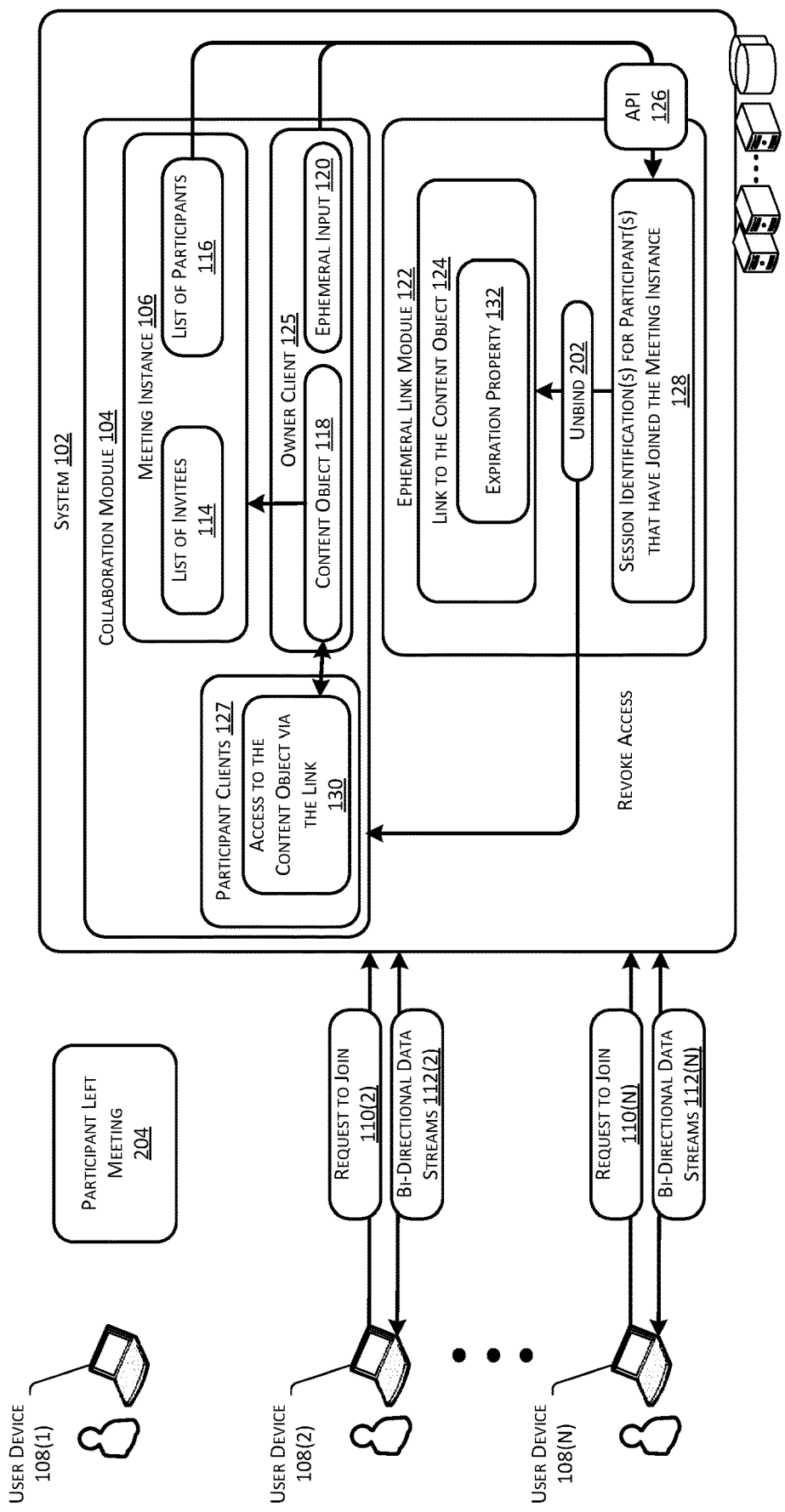
FIG. 2B illustrates the example environment of FIG. 1 in which the system revokes the access to the content object via the ephemeral link based on a participant leaving the meeting instance.

FIG. 2B illustrates the example environment of FIG. 1 in which the system revokes the access to the content object via the ephemeral link based on a participant leaving the meeting instance. As shown in FIG. 2B, the participant using user device 108(1) has left the meeting instance 106, as shown via element 204. Accordingly, the ephemeral link module 122 revokes the access 130 to the content object 118 via the link 124 for the participant by unbinding 202 the participant's session identification 126 from the link 124. However, the ephemeral link module 122 maintains the binding of the session identifications 128 for the other users and user devices 108 (2-N). The condition for unbinding a session identification, as illustrated in FIG. 2B, can be used as an alternative to the expiration property 132 for revoking access (e.g., in a scenario when a user leaves the meeting instance 106 before the meeting instance ends).

Figure 2C:
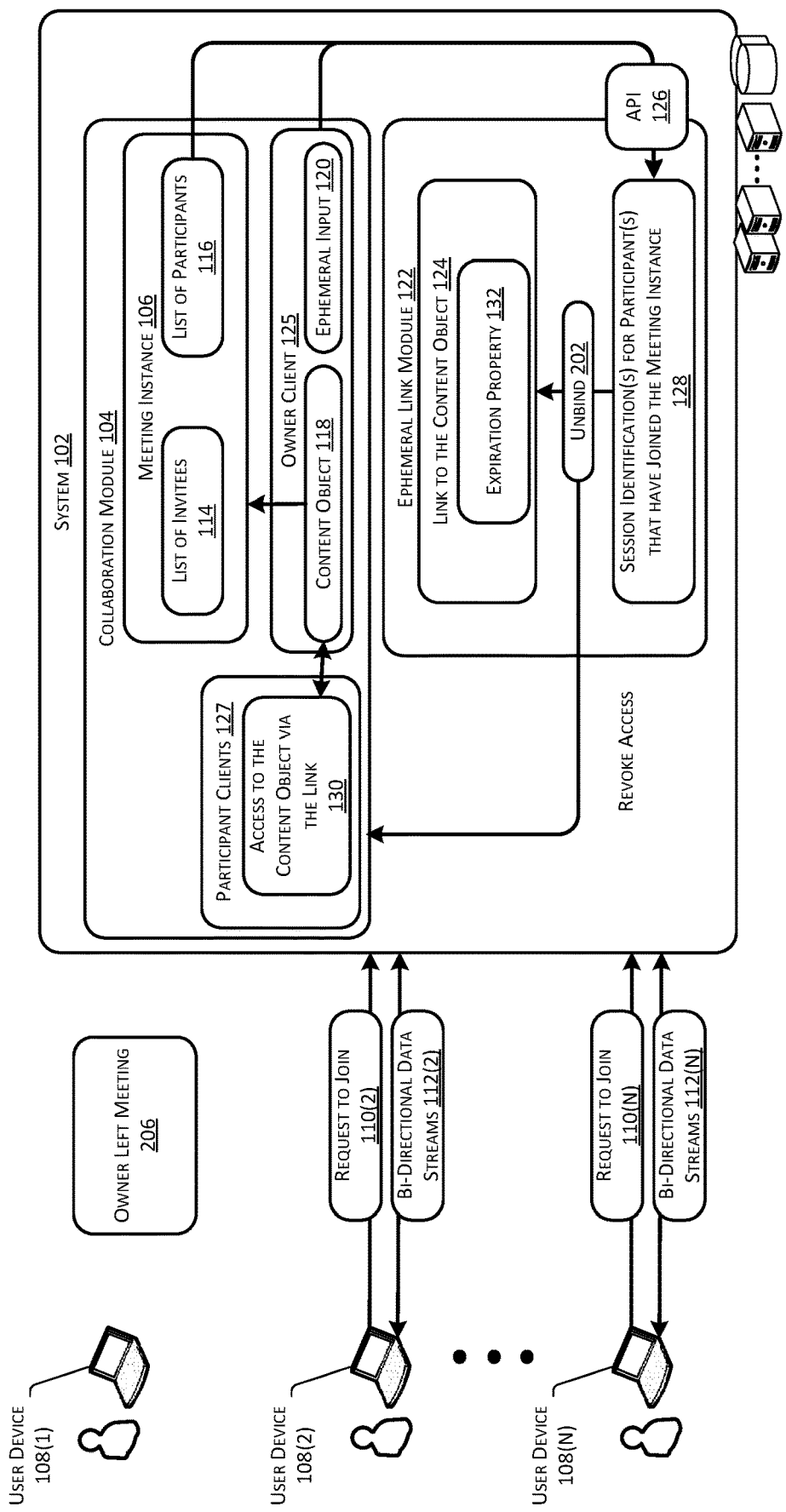
FIG. 2C illustrates the example environment of FIG. 1 in which the system revokes the access to the content object via the ephemeral link based on an owner of the content object leaving the meeting instance.

FIG. 2C illustrates the example environment of FIG. 1 in which the system revokes the access to the content object via the ephemeral link based on an owner of the content object leaving the meeting instance. As shown in FIG. 2C, the participant using user device 108(1) is the owner of the content object 118 and the owner has left the meeting instance 106, as shown via element 206. Accordingly, the ephemeral link module 122 revokes the access 130 to the content object 118 via the link 124 for all the participants by unbinding 202 the session identifications 128 from the link 124. The condition for unbinding a session identification, as illustrated in FIG. 2C, can be used as an alternative to the expiration property 132 for revoking access (e.g., in a scenario when an owner of the content object leaves the meeting instance 106 before the meeting instance ends).

Figure 2D:
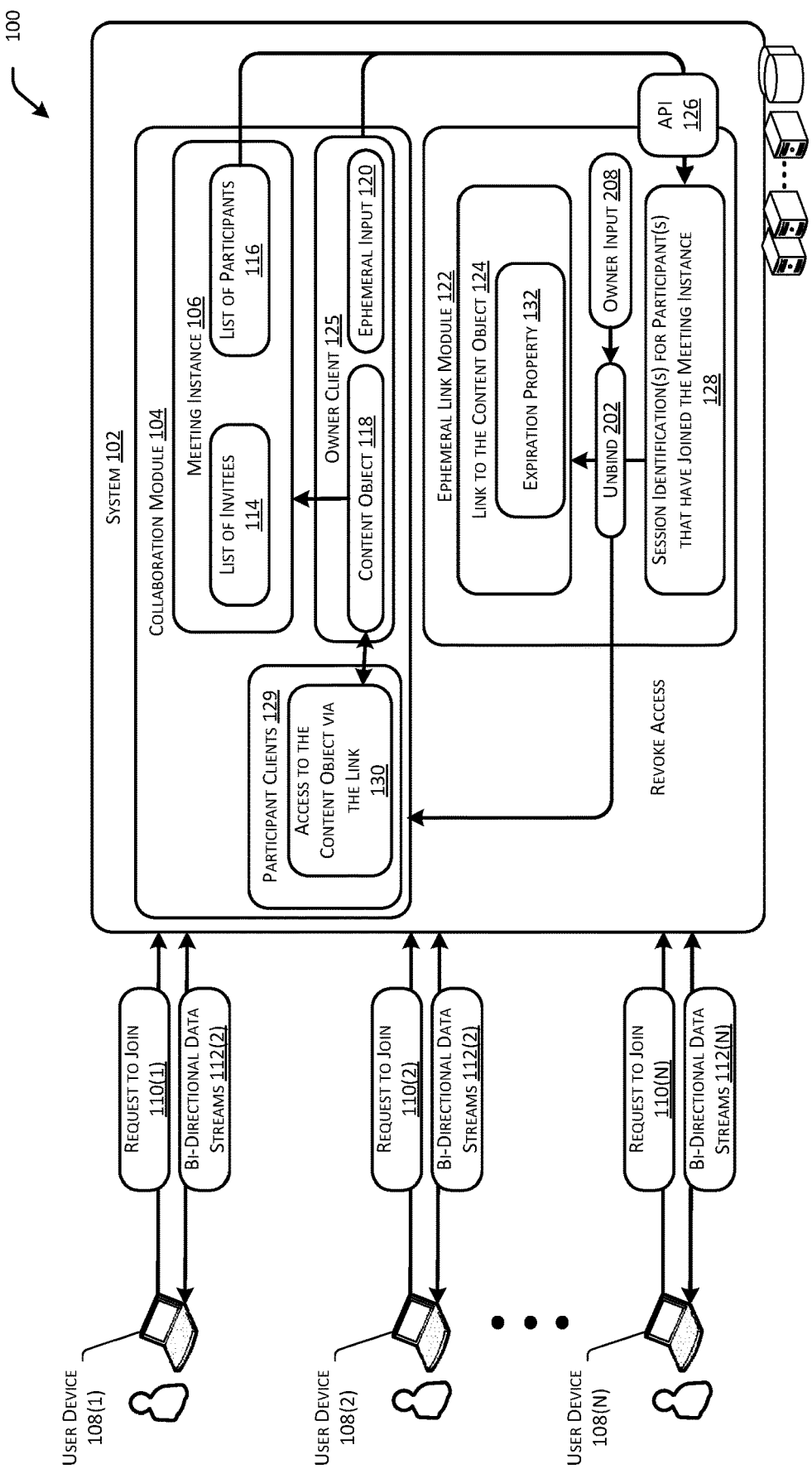
FIG. 2D illustrates the example environment of FIG. 1 in which the system revokes the access to the content object via the ephemeral link based on user input from the owner of the content object.

FIG. 2D illustrates the example environment of FIG. 1 in which the system revokes the access to the content object via the ephemeral link based on user input from the owner of the content object. As shown, the ephemeral link module 122 enables the owner of the content object to provide revocation input (referred to in FIG. 2D as "owner" input 208) for a group of participants or individual participants, at any time after the link 124 has been shared. The owner input 208 unbinds 202 the session identifications 126 from the link 124. The owner of the content object 118 may want to provide the owner input 208 if the owner changes their mind with regard to sharing the content object 118 (e.g., the owner notices some information that should not be shared in a document) and/or the wrong content object 118 is shared.

The example graphical user interfaces, described below with respect to FIGS. 3-7 capture different scenarios and/or display aspects in which access to a content object (e.g., including confidential and/or sensitive content) via an ephemeral link is managed by the disclosed system 102 (e.g., the modules 104 and 122) in FIG. 1.

Figure 3:
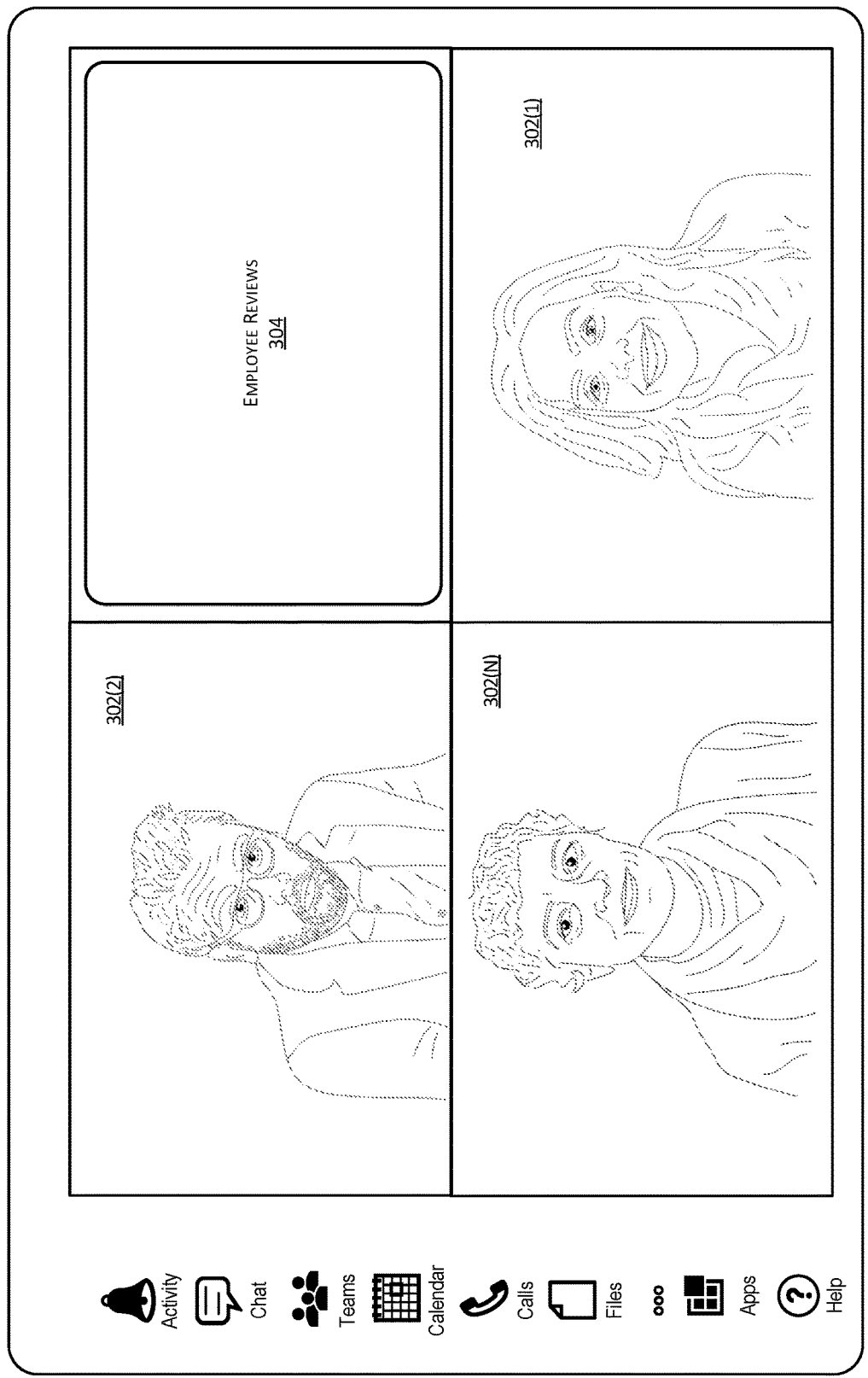
FIG. 3 illustrates an example graphical user interface in which the owner of the content object has joined the meeting instance and shared the content object, and thus, access to the content object via the link is available for the participants.

FIG. 3 illustrates an example graphical user interface 300 in which the owner 302(1) has joined the meeting instance 106 and shares a content object 304 (e.g., content object 118) with ephemeral input 120, and thus, access to the content object 304 (e.g., content object 118) via the link 124 is available for the participants. In the example of FIG. 3, the content object 304 is a document containing employee reviews. After the owner 302(1) of the content object 304 joins the meeting instance 106, shares the content object 304, and provides the ephemeral input 120, the ephemeral link module 122 binds 129 the session identifications 128 for participants 302 (2-N) to the link 124. The access 130 enables a group of users to collaborate on a content object 304 for a short period of time without an owner 302(1) of the content object 304 fearing unwanted modifications to the content object 304 via the link 124 for an extended period of time after the meeting instance 106.

FIG. 4 illustrates an example graphical user interface 400 in which a notification is displayed to the owner 302(1) of the content object 304 allowing the owner 302(1) to dynamically adjust the expiration property that revokes access to the content object 304. The notification 402 provides the owner 302 with the opportunity to dynamically adjust the expiration property, e.g., to shorten access to the content object 304 via the link. As described above, the meeting instance 106 can have a scheduled duration. In the example of FIG. 4, the ephemeral link module 122 is configured to display the notification 402 to the owner 302(1) of the content object 304 when the owner provides input to stop sharing the content object 304 (e.g., closing the document on the owner's device). Consequently, the owner 302(1) has the discretion to stop providing access to the content object 304 via the ephemeral link 124 with the other participants 302 (2-N), before the scheduled end time of the meeting instance 106. For instance, the owner 302(1) selects the "Yes" GUI button in FIG. 4.

Figure 5A:
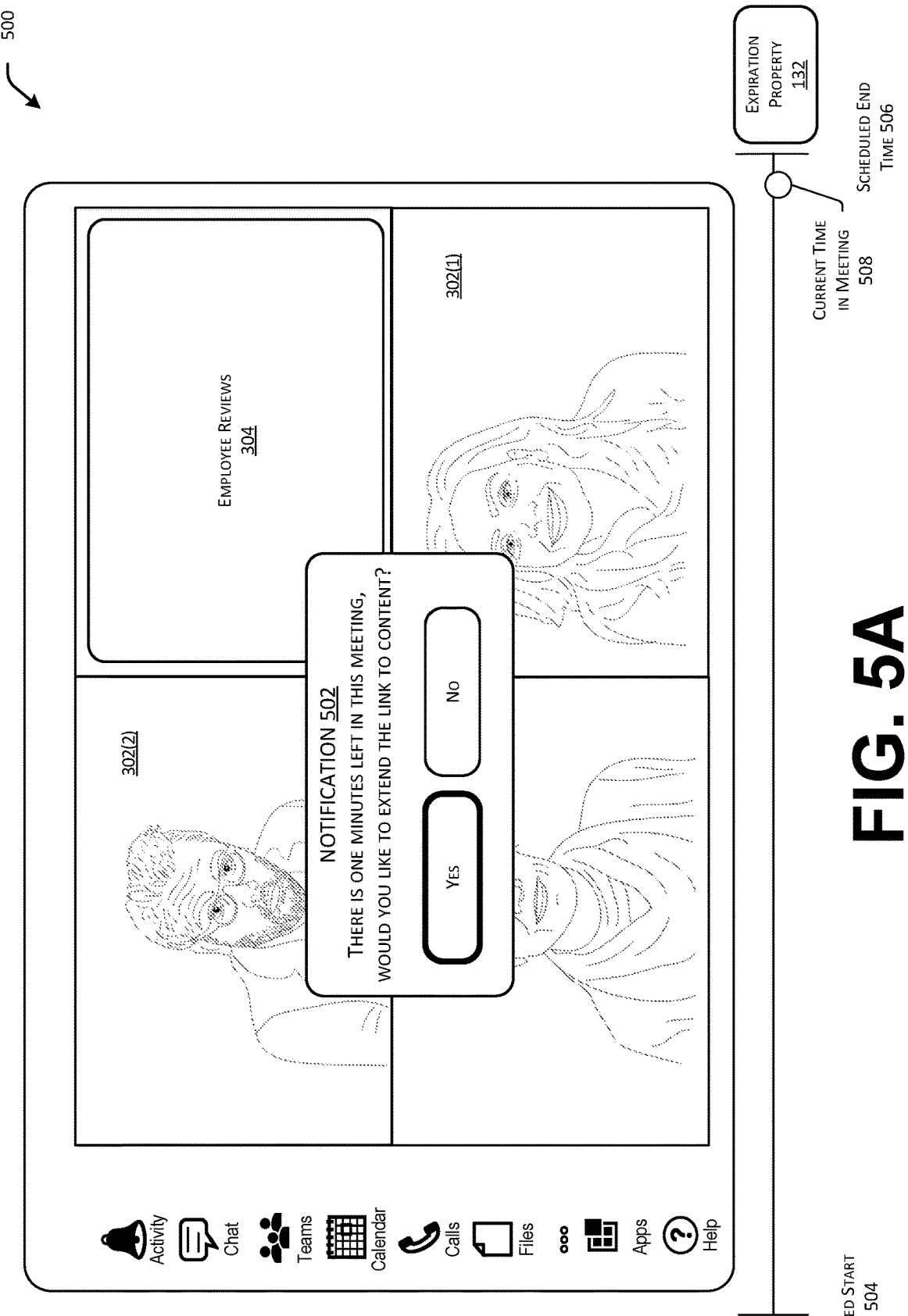
FIG. 5A illustrates an example graphical user interface in which a notification is displayed to alert the owner of the content object that there is one minute left in the meeting. The notification allows the owner the opportunity to dynamically adjust the expiration property, e.g., to extend access to the content object via the link.

FIG. 5A illustrates an example graphical user interface 500 in which a notification 502 is displayed to alert the owner 302(1) of the content object 304 that there is one minute left in the meeting instance 106. As described above, the meeting instance 106 can have a scheduled duration. FIG. 5A illustrates the scheduled duration via a timeline of the meeting instance and the timeline is based on a scheduled start time 504 for the meeting instance and a schedule end time 506. By default, the expiration property 132 is associated with the scheduled end time 506. However, the expiration property 132 can be dynamically adjusted to provide more time for collaboration. The notification 502 provides the owner 302(1) of the content object 304 with the ability to extend access to the content object 304 via the link 124. In the example of FIG. 5A, when the current time 508 in the meeting instance is a predetermined time before the scheduled end time 506 (e.g., one minute), the ephemeral link module 122 is configured to display the notification 502 to the owner 302(1) of the content object 304. Consequently, the owner 302(1) has the discretion to continue sharing the content object 304 via the ephemeral link 124 with the other participants 302 (2-N), for a period of time that extends beyond the end time 506 of the meeting instance 106. For instance, the owner 302(1) selects the "Yes" GUI button in FIG. 5A.

Figure 5B:
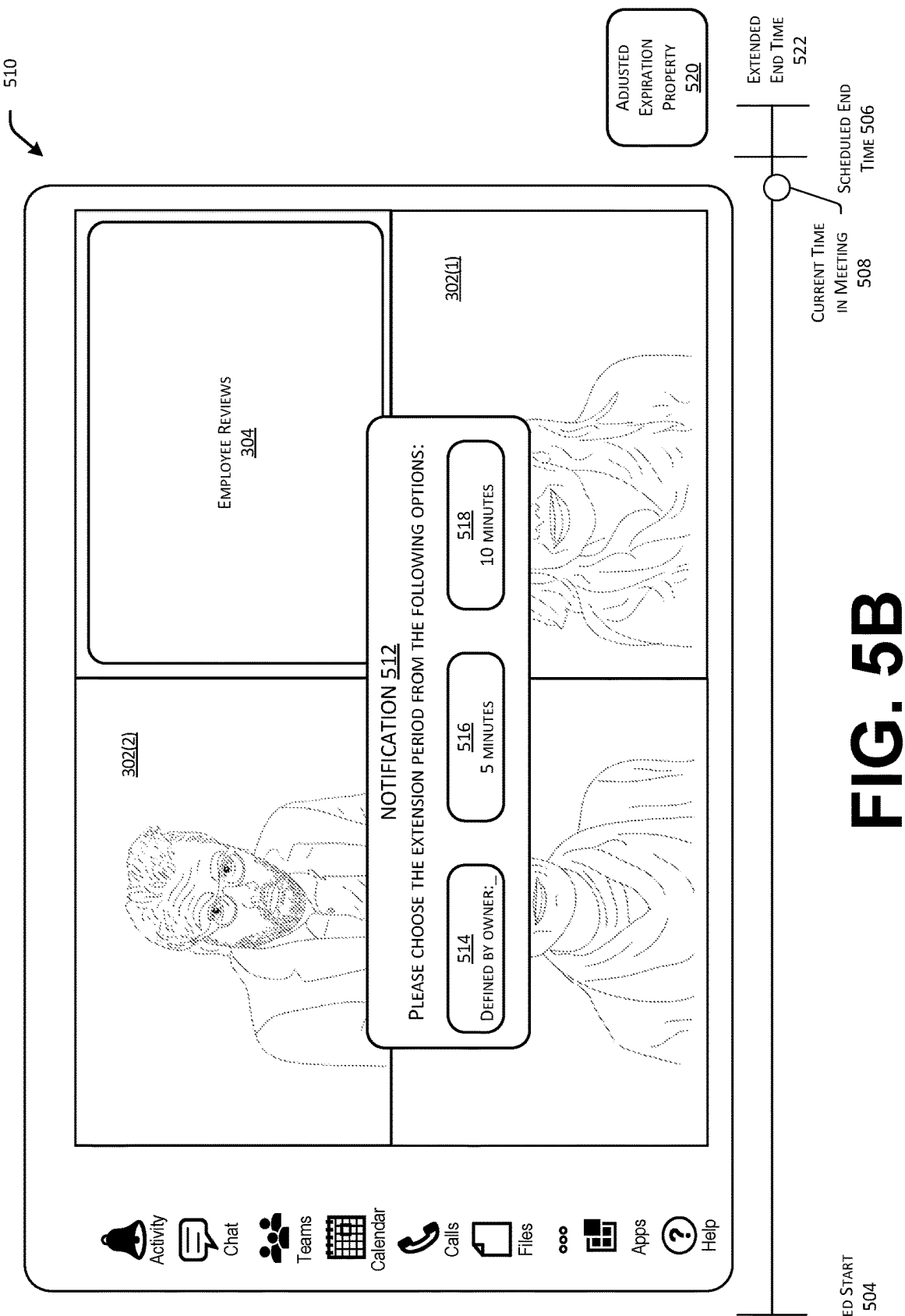
FIG. 5B illustrates an example graphical user interface in which the owner of the content object receives a notification regarding the length of the extension for the link to the content object. The extension period can be defined by the user, or the user may select one of the default extension times (e.g., five minutes, ten minutes).

FIG. 5B illustrates an example graphical user interface 510 after the owner of the content object has selected "yes" via the notification 502, as shown in FIG. 5A. In FIG. 5B, the owner 302(1) of the content object 304 is presented with a notification 512 that provides options for the extension period. In one example, the owner 302(1) defines the extension period via GUI element 514 (e.g., the user enters three minutes, eighty minutes). In other examples, the owner 302(1) selects one of the default extension times via GUI elements 516, 518 (e.g., five minutes, ten minutes). The ephemeral link module 122 adjusts the expiration property 132 in FIG. 5B to an adjusted expiration property 520 based on the selection by the owner 302(1). As described above, the adjusted expiration property 520 updates the time of the unbinding 202 of the session identification(s) 128 from the link 124 to the content object 304. More specifically, adjusted expiration property 520 is associated with an extended end time 522 for the meeting instance.

Figure 6:
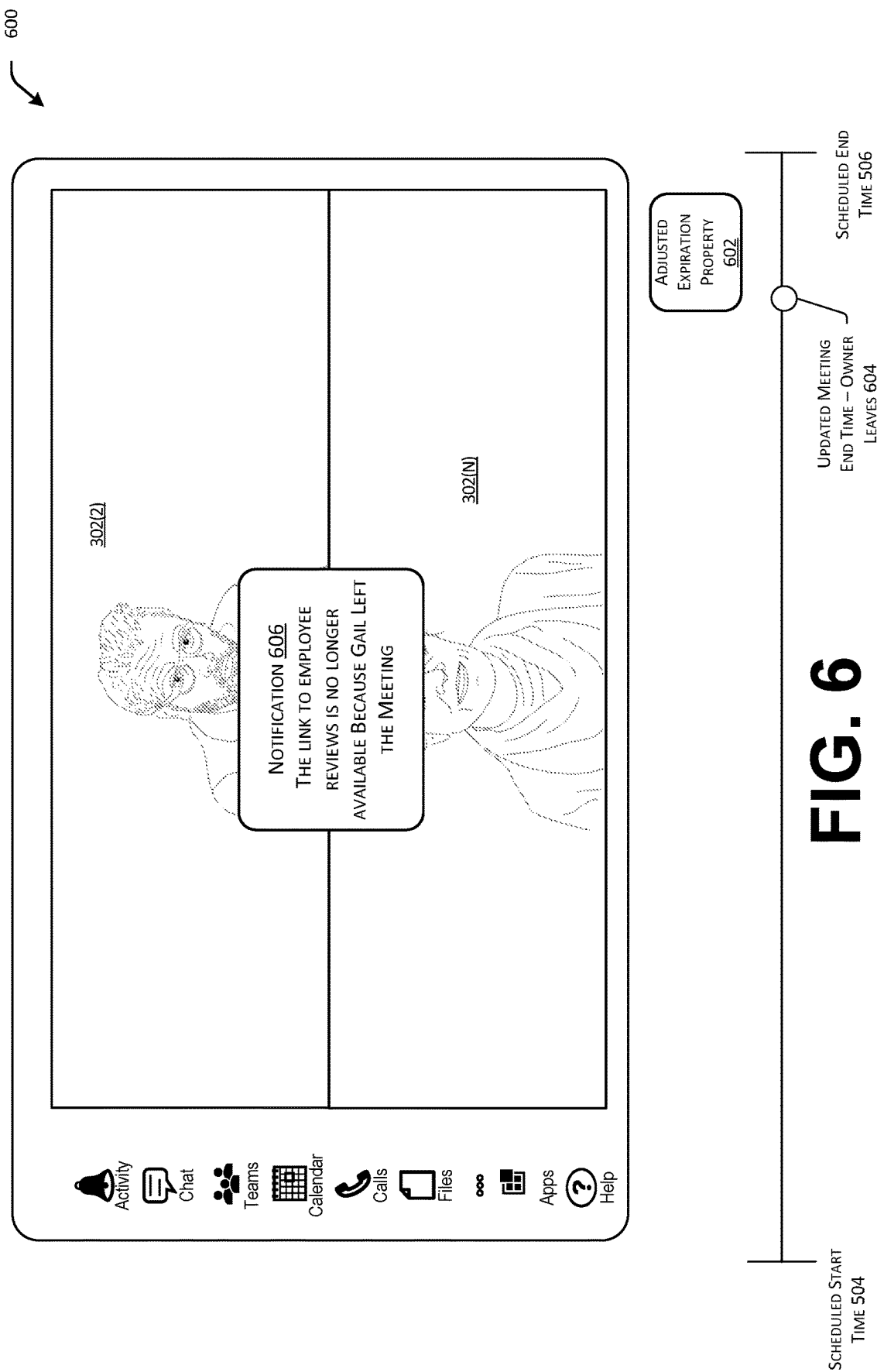
FIG. 6 illustrates an example graphical user interface in which the owner of the content object has left before the scheduled meeting end time and the link to the content object has an updated expiration property based on the actual meeting end time.

FIG. 6 illustrates an example graphical user interface 600 in which the owner of the content object leaves before the scheduled meeting end time and the link to the content object has an updated expiration property based on the actual meeting end time. As described above, by default, the ephemeral link module 122 sets the expiration property 132 for the scheduled meeting end time 506. But if the owner 302(1) of the content object 304 leaves the meeting instance 106 before the meeting instance 106 is scheduled to end, the ephemeral link module 122 updates the expiration property 132 in FIG. 6 to an adjusted expiration property 602 based on the time 604 when the owner 302(1) of the content object 304 leaves the meeting instance 106. Furthermore, the ephemeral link module 122 can display a notification 606 to the participants 302 (2-N) that are still participating in the meeting instance 106, informing them that access to the content object 304 via the link has expired because "Gail" 302(1) left the meeting instance 106. Based on the adjusted expiration property 602, the ephemeral link module 122 unbinds the session identification(s) 128 from the link 124 to the content object 304, thereby revoking access 130 to the content object 304 via the link 124.

Figure 7:
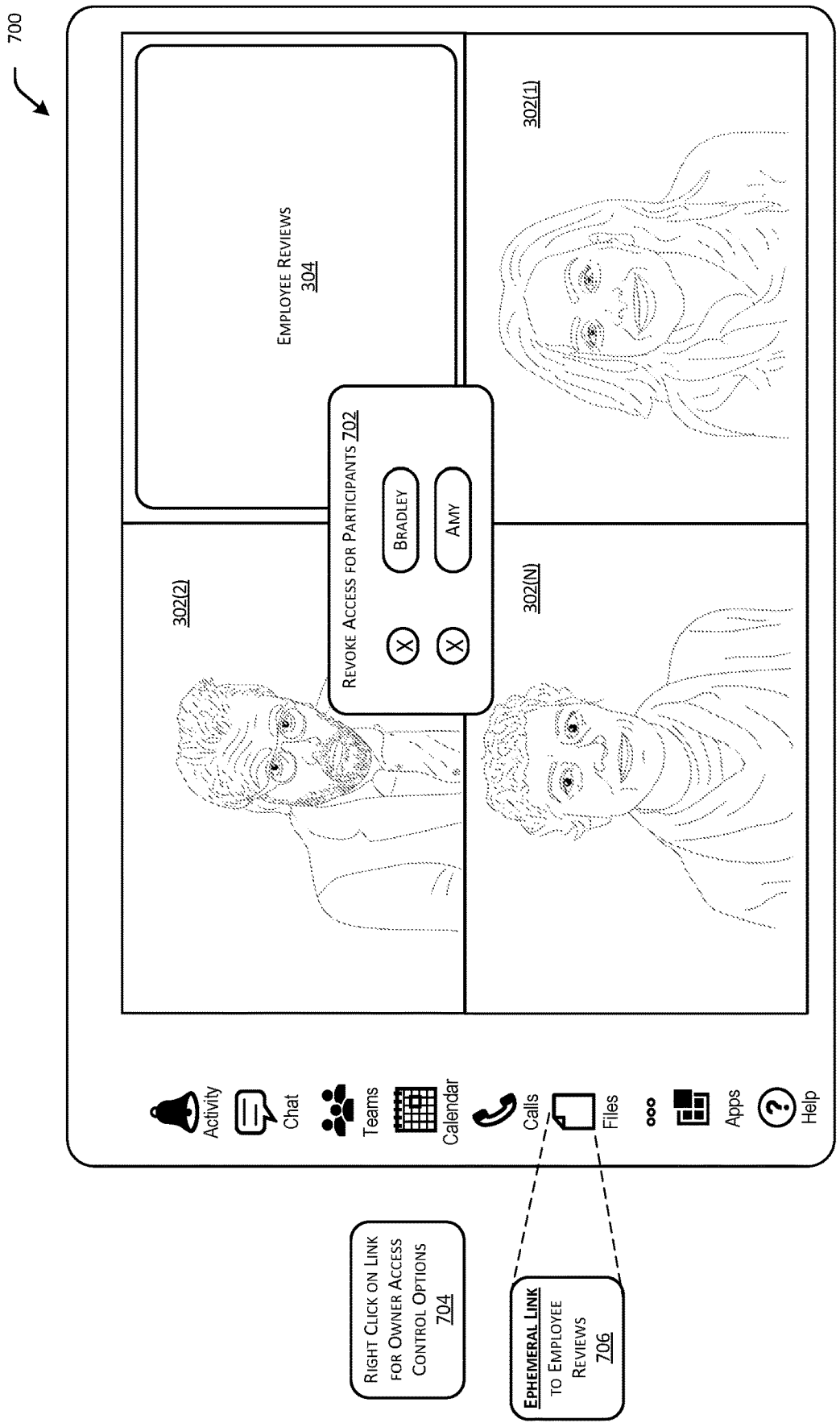
FIG. 7 illustrates an example graphical user interface in which the owner of the content object exercises discretion in selecting the participants who will have access to content object via the link.

FIG. 7 illustrates an example graphical user interface 700 in which the owner of the content object exercises discretion in selecting the participants who will have access to the content object via the link. The owner 302(1) of the content object 304 selects which participants have access to the content object 304 through a list of participants 702. In one example, the owner of the content object 302(1) accesses owner access control options 704 by right clicking on the file folder 706 within the meeting instance 106. Access to the file folder is limited to the owner's client. The owner 302(1) then individually selects participants, from the list of participants 702, for which access 130 is revoked. Once the owner 302(1) of the content object 304 revokes a participant's access 130, the participant's session identification 128 unbinds 202 from the link 124 to the content object 304. For example, as shown in FIG. 7, Gail decides to remove Bradley's and Amy's access to the content object 304 via the list of participants 702. Following Gail's revocation input, Bradley's and Amy's session identifications unbind from the link to the content object.

Figure 8:
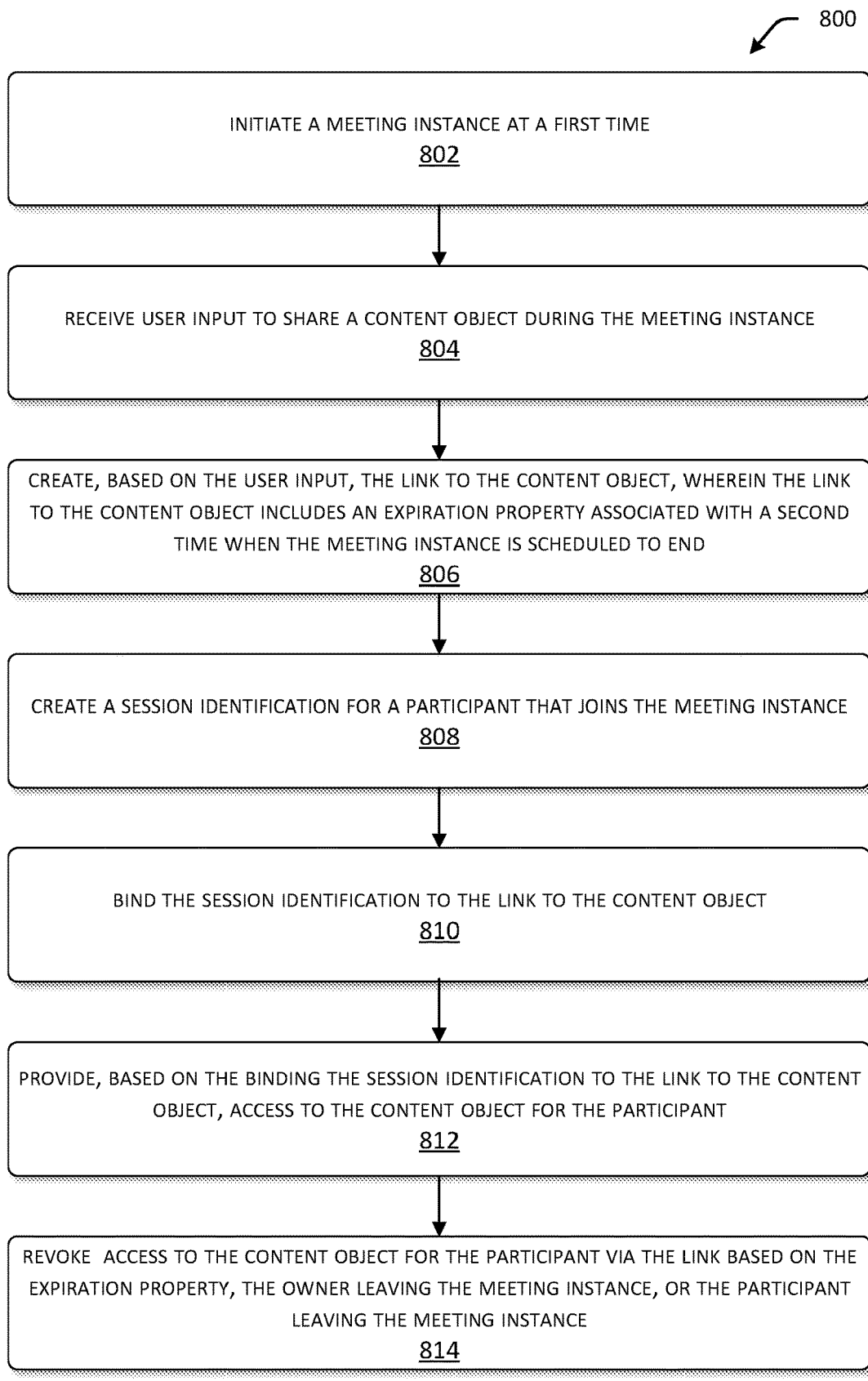
FIG. 8 is an example flow diagram showing aspects of a method implemented to provide an ephemeral link during a meeting instance in order to provide an owner of a content object with complete control and/or transparency of the collaboration context.

Turning now to FIG. 8, an example flow diagram 800 showing aspects of a method implemented to provide an ephemeral link during a meeting instance in order to provide an owner of a content object with complete control and/or transparency of the collaboration context.

At operation 802, the system initiates the meeting instance at a first time. At operation 804, the system receives user input to share a content object during the meeting instance (e.g., based on a user selection of a document to share). At operation 806, the system creates, based on the user input, the link to the content object. As described above, the link to the content object includes an expiration property associated with a second time when the meeting instance is scheduled to end.

At operation 808, the system creates a session identification for a participant that joins the meeting instance. At operation 810, the system binds the session identification to the link to the content object. At operation 812, the system provides, based on the binding the session identification to the link to the content object, access to the content object for the participant via the link. At operation 814, the system revokes the access to the content object for the participant via the link based on the expiration property, the owner of the content object leaving the meeting instance, or the participant leaving the meeting instance.

For ease of understanding, the method discussed in this disclosure are delineated as separate operations represented as independent blocks. However, these separately delineated operations should not be construed as necessarily order dependent in their performance. The order in which the method is described is not intended to be construed as a limitation, and any number of the described blocks may be combined in any order to implement the method or an alternate method. Moreover, it is also possible that one or more of the provided operations is modified or omitted.

The particular implementation of the technologies disclosed herein is a matter of choice dependent on the performance and other requirements of a computing device. Accordingly, the logical operations described herein may be referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated method can end at any time and need not be performed in their entirety. Some or all operations of the method, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system.

Figure 9:
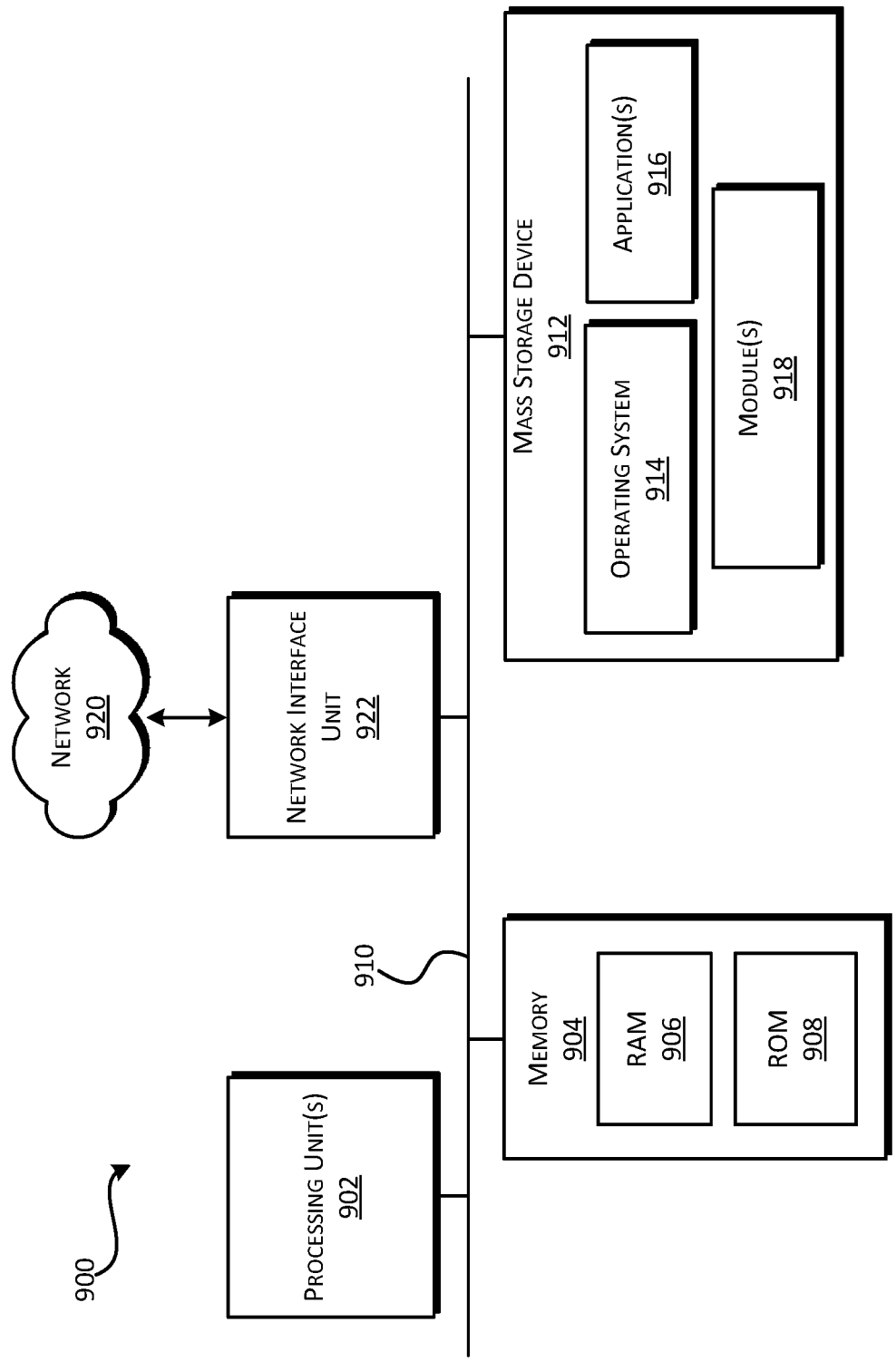
FIG. 9 illustrates a computer architecture diagram showing an illustrative computer hardware and software architecture for a computing system capable of implementing aspects of the techniques and technologies presented herein.

FIG. 9 shows additional details of an example computer architecture 900 for a device, such as a computer or a server capable of executing computer instructions. The computer architecture 900 illustrated in FIG. 9 includes processing unit(s) 902, a system memory 904, including a random-access memory 906 (RAM) and a read-only memory (ROM) 908, and a system bus 910 that couples the memory 904 to the processing unit(s) 902. The processing units 902 may also comprise or be part of a processing system. In various examples, the processing units 902 of the processing system are distributed. Stated another way, one processing unit 902 of the processing system may be located in a first location (e.g., a rack within a datacenter) while another processing unit 902 of the processing system is located in a second location separate from the first location.

Processing unit(s), such as processing unit(s) 902, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 900, such as during startup, is stored in the ROM 908. The computer architecture 900 further includes a mass storage device 912 for storing an operating system 914, application(s) 916, modules 918, and other data described herein.

The mass storage device 912 is connected to processing unit(s) 902 through a mass storage controller connected to the bus 910. The mass storage device 912 and its associated computer-readable media provide non-volatile storage for the computer architecture 900. Although the description of computer-readable media contained herein refers to a mass storage device, it should be appreciated by those skilled in the art that computer-readable media can be any available computer-readable storage media or communication media that can be accessed by the computer architecture 900.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 900 may operate in a networked environment using logical connections to remote computers through the network 920. The computer architecture 900 may connect to the network 920 through a network interface unit 922 connected to the bus 910.

It should be appreciated that the software components described herein may, when loaded into the processing unit(s) 902 and executed, transform the processing unit(s) 902 and the overall computer architecture 900 from a general-purpose computing system into a special-purpose computing system customized to facilitate the functionality presented herein. The processing unit(s) 902 may be constructed from any number of transistors or other discrete circuit elements, which may individually or collectively assume any number of states. More specifically, the processing unit(s) 902 may operate as a finite-state machine, in response to executable instructions contained within the software modules disclosed herein. These computer-executable instructions may transform the processing unit(s) 902 by specifying how the processing unit(s) 902 transition between states, thereby transforming the transistors or other discrete hardware elements constituting the processing unit(s) 902.

The disclosure presented herein also encompasses the subject matter set forth in the following clauses.

Example Clause A, a method for providing a link for collaborative use during a meeting instance comprising: initiating the meeting instance at a first time; receiving user input to share a content object during the meeting instance; creating, based on the user input, the link to the content object, wherein the link to the content object includes an expiration property associated with a second time when the meeting instance is scheduled to end; creating a session identification for a participant that joins the meeting instance; binding the session identification to the link to the content object; and providing, based on the binding the session identification to the link to the content object, access to the content object for the participant via the link to the content object.

Example Clause B, the method of Example Clause A, further comprising revoking, based on the expiration property, the access to the content object for the participant by unbinding the session identification from the link to the content object.

Example Clause C, the method of Example Clause A, further comprising: receiving revocation input from an owner of the content object; and revoking, based on the revocation input, the access to the content object for the participant by unbinding the session identification from the link to the content object.

Example Clause D, the method of Example Clause A, further comprising: displaying a notification, to an owner of the content object, asking whether access to the content object for the participant should be extended from the second time to a third time after the second time; receiving user input requesting that access to the content object for the participant be extended from the second time to the third time; adjusting the expiration property so that the expiration property is associated with the third time rather than the second time; and revoking, based on the expiration property that has been adjusted to be associated with the third time, the access to the content object for the participant by unbinding the session identification from the link to the content object.

Example Clause E, the method of Example Clause A, further comprising: determining that an owner of the content object has left the meeting instance at a third time that is before the second time; adjusting the expiration property so that the expiration property is associated with the third time rather than the second time; and revoking, based on the expiration property that has been adjusted to be associated with the third time, the access to the content object for the participant by unbinding the session identification from the link to the content object.

Example Clause F, the method of Example Clause A, further comprising: determining that the participant has left the meeting instance; and revoking, based on the determining that the participant has left the meeting instance, the access to the content object for the participant by unbinding the session identification from the link to the content object.

Example Clause G, the method of Example Clause A, further comprising: determining, before the second time when the meeting instance is scheduled to end, that the content object is no longer being shared during the meeting instance; displaying a notification, to an owner of the content object, asking whether access to the content object for the participant should be shortened from the second time to a third time before the second time; receiving user input requesting that access to the content object for the participant be shortened from the second time to the third time; adjusting the expiration property so that the expiration property is associated with the third time rather than the second time; and revoking, based on the expiration property that has been adjusted to be associated with the third time, the access to the content object for the participant by unbinding the session identification from the link to the content object.

Example Clause H, the method of any one of Example Clauses A through G, wherein: the user input causes a client associated with an owner of the content object to request that the link be created; and access to the content object for the participant is provided via the link to the content object by the client automatically sending the link to the content object to another client associated with the participant.

Example Clause I, the method of any one of Example Clauses A through H, wherein the user input specifically designates that access to the content object be tied to the meeting instance.

Example Clause J, a system providing a link for collaborative use during a meeting instance comprising: a processing system; and computer-readable storage media storing instructions that, when executed by the processing system, cause the system to perform operations comprising: initiating the meeting instance at a first time; receiving user input to share a content object during the meeting instance; creating, based on the user input, the link to the content object, wherein the link to the content object includes an expiration property associated with a second time when the meeting instance is scheduled to end; creating a session identification for a participant that joins the meeting instance; binding the session identification to the link to the content object; and providing, based on the binding the session identification to the link to the content object, access to the content object for the participant via the link to the content object.

Example Clause K, the system of Example Clause J, wherein the operations further comprise revoking, based on the expiration property, the access to the content object for the participant by unbinding the session identification from the link to the content object.

Example Clause L, the system of Example Clause J, wherein the operations further comprise: receiving revocation input from an owner of the content object; and revoking, based on the revocation input, the access to the content object for the participant by unbinding the session identification from the link to the content object.

Example Clause M, the system of Example Clause J, wherein the operations further comprise: displaying a notification, to an owner of the content object, asking whether access to the content object for the participant should be extended from the second time to a third time after the second time; receiving user input requesting that access to the content object for the participant be extended from the second time to the third time; adjusting the expiration property so that the expiration property is associated with the third time rather than the second time; and revoking, based on the expiration property that has been adjusted to be associated with the third time, the access to the content object for the participant by unbinding the session identification from the link to the content object.

Example Clause N, the system of Example Clause J, wherein the operations further comprise: determining that an owner of the content object has left the meeting instance at a third time that is before the second time; adjusting the expiration property so that the expiration property is associated with the third time rather than the second time; and revoking, based on the expiration property that has been adjusted to be associated with the third time, the access to the content object for the participant by unbinding the session identification from the link to the content object.

Example Clause O, the system of Example Clause J, wherein the operations further comprise: determining that the participant has left the meeting instance; and revoking, based on the determining that the participant has left the meeting instance, the access to the content object for the participant by unbinding the session identification from the link to the content object.

Example Clause P, the system of Example Clause J, wherein the operations further comprise: determining, before the second time when the meeting instance is scheduled to end, that the content object is no longer being shared during the meeting instance; displaying a notification, to an owner of the content object, asking whether access to the content object for the participant should be shortened from the second time to a third time before the second time; receiving user input requesting that access to the content object for the participant be shortened from the second time to the third time; adjusting the expiration property so that the expiration property is associated with the third time rather than the second time; and revoking, based on the expiration property that has been adjusted to be associated with the third time, the access to the content object for the participant by unbinding the session identification from the link to the content object.

Example Clause Q, the system of any one of Example Clauses J through P, wherein: the user input causes a client associated with an owner of the content object to request that the link be created; and access to the content object for the participant is provided via the link to the content object by the client automatically sending the link to the content object to another client associated with the participant.

Example Clause R, the system any one of Example Clause J through Q, wherein the user input specifically designates that access to the content object be tied to the meeting instance.

Example Clause S, computer-readable storage media storing instructions that, when executed by a processing system, cause a system to perform operations comprising: initiating the meeting instance at a first time; receiving user input to share a content object during the meeting instance; creating, based on the user input, the link to the content object, wherein the link to the content object includes an expiration property associated with a second time when the meeting instance is scheduled to end; creating a session identification for a participant that joins the meeting instance; binding the session identification to the link to the content object; and providing, based on the binding the session identification to the link to the content object, access to the content object for the participant via the link to the content object.

Example Clause T, the computer-readable storage media of Example Clause S, wherein the operations further comprise revoking, based on the expiration property, the access to the content object for the participant by unbinding the session identification from the link to the content object.

While certain example embodiments have been described, these embodiments have been presented by way of example only, and are not intended to limit the scope of the inventions disclosed herein. Thus, nothing in the foregoing description is intended to imply that any particular feature, characteristic, step, component, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different session identifications, two different participants).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for providing a link to a content object for collaborative use during a meeting instance comprising:
   initiating the meeting instance at a first time;
   receiving user input to share the content object during the meeting instance;
   creating, based on the user input, the link to the content object, wherein:
     the link to the content object includes an expiration property associated with a second time when the meeting instance is scheduled to end; and
     the expiration property is dynamically adjustable based on an action by an owner of the content object during the meeting instance;
   creating a session identification for a participant that joins the meeting instance;
   binding the session identification to the link to the content object;
   providing, based on the binding the session identification to the link to the content object, access to the content object for the participant via the link to the content object;
   determining that the owner of the content object has left the meeting instance at a third time that is before the second time, wherein leaving the meeting instance is the action by the owner of the content object;
   adjusting the expiration property so that the expiration property is associated with the third time rather than the second time; and
   revoking, based on the expiration property, the access to the content object for the participant by unbinding the session identification from the link to the content object.

2. The method of claim 1, further comprising receiving, as the action by the owner of the content object, revocation input from the owner of the content object, wherein the access to the content object for the participant is revoked based on the revocation input rather than the expiration property.

3. The method of claim 1, further comprising determining that the participant has left the meeting instance, wherein the access to the content object is revoked based on the determining that the participant has left the meeting instance rather than the expiration property.

4. The method of claim 1, wherein:
   the user input causes a client associated with the owner of the content object to request that the link to the content object be created; and
   the access to the content object for the participant is provided via the link to the content object by the client automatically sending the link to the content object to another client associated with the participant.

5. The method of claim 1, wherein the user input specifically designates that the access to the content object be tied to the meeting instance.

6. A system providing a link to a content object for collaborative use during a meeting instance comprising:
a processing system; and
computer-readable storage media storing instructions that, when executed by the processing system, cause the system to perform operations comprising:
initiating the meeting instance at a first time;
receiving user input to share the content object during the meeting instance;
creating, based on the user input, the link to the content object, wherein:
the link to the content object includes an expiration property associated with a second time when the meeting instance is scheduled to end; and
the expiration property is dynamically adjustable based on an action by an owner of the content object during the meeting instance;
creating a session identification for a participant that joins the meeting instance;
binding the session identification to the link to the content object;
providing, based on the binding the session identification to the link to the content object, access to the content object for the participant via the link to the content object;
displaying a notification, to the owner of the content object, asking whether the access to the content object for the participant should be extended from the second time to a third time after the second time;
receiving, as the action by the owner of the content object, another user input requesting that the access to the content object for the participant be extended from the second time to the third time;
adjusting the expiration property so that the expiration property is associated with the third time rather than the second time; and
revoking, based on the expiration property, the access to the content object for the participant by unbinding the session identification from the link to the content object.

7. The system of claim 6, wherein the operations further comprise receiving revocation input from the owner of the content object, wherein the access to the content object for the participant is revoked based on the revocation input rather than the expiration property.

8. The system of claim 6, wherein the operations further comprise determining that the participant has left the meeting instance, wherein the access to the content object is revoked based on the determining that the participant has left the meeting instance rather than the expiration property.

9. The system of claim 6, wherein:
the user input causes a client associated with the owner of the content object to request that the link to the content object be created; and
the access to the content object for the participant is provided via the link to the content object by the client automatically sending the link to the content object to another client associated with the participant.

10. The system of claim 6, wherein the user input specifically designates that the access to the content object be tied to the meeting instance.

11. Computer-readable storage media storing instructions that,
when executed by a processing system, cause a system to perform operations comprising:
initiating a meeting instance at a first time;
receiving user input to share a content object during the meeting instance;
creating, based on the user input, a link to the content object, wherein:
the link to the content object includes an expiration property associated with a second time when the meeting instance is scheduled to end; and
the expiration property is dynamically adjustable based on an action by an owner of the content object during the meeting instance;
creating a session identification for a participant that joins the meeting instance;
binding the session identification to the link to the content object;
providing, based on the binding the session identification to the link to the content object, access to the content object for the participant via the link to the content object;
determining, before the second time when the meeting instance is scheduled to end, that the content object is no longer being shared during the meeting instance;
displaying a notification, to the owner of the content object, asking whether the access to the content object for the participant should be shortened from the second time to a third time before the second time;
receiving, as the action by the owner of the content object, another user input requesting that the access to the content object for the participant be shortened from the second time to the third time;
adjusting the expiration property so that the expiration property is associated with the third time rather than the second time; and
revoking, based on the expiration property, the access to the content object for the participant by unbinding the session identification from the link to the content object.

* * * * *